United States Patent
Khare et al.

(10) Patent No.: US 6,274,031 B1
(45) Date of Patent: *Aug. 14, 2001

(54) TRANSPORT DESULFURIZATION PROCESS UTILIZING A SULFUR SORBENT THAT IS BOTH FLUIDIZABLE AND CIRCULATABLE AND A METHOD OF MAKING SUCH SULFUR SORBENT

(75) Inventors: Gyanesh P. Khare, Bartlesville; Donald R. Engelbert, Copan; Bryan W. Cass, Bartlesville, all of OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 09/620,628

(22) Filed: Jul. 20, 2000

Related U.S. Application Data

(62) Division of application No. 09/492,941, filed on Jan. 27, 2000, which is a division of application No. 09/229,027, filed on Jan. 12, 1999, now Pat. No. 6,056,871, which is a division of application No. 08/826,206, filed on Mar. 27, 1997, now Pat. No. 5,914,292, which is a continuation-in-part of application No. 08/430,648, filed on Apr. 28, 1995, now abandoned, which is a continuation-in-part of application No. 08/206,300, filed on Mar. 4, 1994, now Pat. No. 5,439,867.

(51) Int. Cl.$^7$ .................. C10G 17/00; C10G 29/00; C10G 25/00
(52) U.S. Cl. .............. 208/250; 208/247; 208/208 R; 208/248; 208/244; 208/299; 208/243
(58) Field of Search .................. 208/250, 247, 208/208 R, 248, 244, 249, 243

(56) References Cited

U.S. PATENT DOCUMENTS 6,056,871 * 5/2000 Khare et al. .................. 208/250

* cited by examiner

Primary Examiner—Hien Tran
Assistant Examiner—Thuan D. Dang
(74) Attorney, Agent, or Firm—Richmond, Hitchcock, Fish & Dollar

(57) ABSTRACT

A novel circulatable sorbent material suitable for use in a transport desulfurization system for removing sulfur from a fluid stream containing sulfur and the use thereof in such a transport desulfurization system. The transport desulfurization process utilizes a circulatable particulate material containing alumina, silica, zinc oxide and a metal oxide which is contacted with a fluid stream and thereafter separated and reused with a portion being regenerated.

36 Claims, 4 Drawing Sheets

TRANSPORT DESULFURIZATION PROCESS UTILIZING A SULFUR SORBENT THAT IS BOTH FLUIDIZABLE AND CIRCULATABLE AND A METHOD OF MAKING SUCH SULFUR SORBENT

CROSS-REFERENCE TO PENDING APPLICATIONS

This application is a division of application Ser. No. 09/492,941 filed on Jan. 27, 2000 which is a division of application Ser. No. 09/229,027 filed on Jan. 12, 1999, now U.S. Pat. No. 6,056,871, which is a division of application Ser. No. 08/826,206 filed on Mar. 27, 1997, now U.S. Pat. No. 5,914,292, which is a continuation-in-part of application Ser. No. 08/430,648, filed Apr. 28, 1995, now abandoned which is a continuation-in-part of application Ser. No. 08/206,300, filed Mar. 4, 1994, now U.S. Pat. No. 5,439,867.

BACKGROUND OF THE INVENTION

This invention relates to an improved process for removing hydrogen sulfide from fluid streams. In another aspect, this invention relates to a composition suitable for use in such process. A further aspect of this invention relates to an improved method for the manufacture of a sulfur sorbent suitable for use in the removal of hydrogen sulfide from fluid streams.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

Traditionally, sulfur sorbents used in processes for the removal of sulfur from fluid streams have been agglomerates utilized in fixed bed applications. Because of the various process advantages from the use of fluidized beds, it can be desirable to utilize a fluidized bed of zinc oxide based sorbent in the removal of sulfur components from fluid streams. There are, however, a number of problems associated with the development of the use of fluidized beds in sulfur sorption that, prior to the discovery of the invention described herein, have not been resolved. Particularly, conventional methods for the production of fluidizable materials have necessarily required spray drying techniques in order to obtain particle sizes in the fluidizable range and to obtain the sufficiently spherically shaped particles thought to be necessary for fluidization. Spray drying techniques, however, have drawbacks due to their relatively high cost and comparatively low production capacity. It would be desirable to have a method for economically producing a fluidizable sorbent material without resort to costly spray drying techniques and to utilize the advantages of a fluidized bed in the removal of sulfur compounds from sulfur-containing fluid streams.

Another concern associated with the use of fluidizable materials is the attrition losses resulting from the fluidized particles colliding with each other and with the equipment walls which define a fluidization zone that contains the fluidized bed. It is desirable to keep attrition losses of the sorbent as low as is possible in order to minimize replenishment of the material and disposal requirements. The attrition resistance of a fluidizable material provides a measure of the weight loss of the fluidizable material when it is used under the harsh operating conditions of a fluidized bed.

While fluidized bed reactors can provide benefits over other types of reactors, such as fixed bed and moving bed reactors, they still present certain disadvantages. Among them are the capital costs associated with the special equipment required for operating fluidized bed reactors. Another disadvantage of the use of fluidized bed systems in sulfur sorption is the need to use diluted air for regeneration of a used sulfur sorbent.

A transport reactor system can be a desirable system for use in the removal of hydrogen sulfide due to the lower capital costs associated with such system. However, the effectiveness of a transport reactor system is substantially dependent upon the sorbent used in the system. The sorbent must have the physical properties that make it circulatable while still having properties suitable for use as a sulfur sorbent. To be circulatable, the sorbent must be able to be fluidized within a fluidization zone by a fluid stream and to be conveyed within such fluidization zone against the force of gravity at high linear velocities, and it must also be circulatable within a transfer zone in the direction of gravity but at linear circulating velocities significantly lower than those within the fluidization zone. Only sorbent particles with certain specific properties are circulatable within a transport reactor system.

SUMMARY OF THE INVENTION

It is thus an object of the present invention to provide a novel method for economically producing a fluidizable sulfur sorbent material without resort to the use of a spray drying technique.

Another object of this invention is to provide a process for removing hydrogen sulfide from a fluid stream utilizing a fluidized bed of sorbent material.

A further object of this invention is to provide a fluidizable material having an enhanced attrition resistance when utilized in a fluidized bed.

A still further object of this invention is to provide a fluidized bed for recovering sulfur from a fluid stream utilizing a fluidizable material having an enhanced attrition resistance for reducing the loss of fluidizable material due to attrition.

Yet another object of the present invention is to provide a sulfur sorbent that is circulatable within a transport desulfurization process system.

Yet another object of this invention is to provide a transport desulfurization process for removing hydrogen sulfide from a fluid stream by use of a circulatable sorbent material.

Yet still a further object of this invention is to provide a method for making a zinc oxide based sorbent that is circulatable within a transport desulfurization process system.

In accordance with one aspect of the present invention, there is provided a particulate fluidizable sorbent having a mean particle size in the range of from about 20 micrometers to about 500 micrometers and comprising alumina, silica and zinc oxide. The particulate fluidizable sorbent can further have an enhanced attrition resistance by the incorporation of an effective concentration of metal oxide for providing the enhanced attrition resistance.

In accordance with another aspect of the invention, there is provided a method of making a fluidizable, zinc oxide based sorbent material having a mean particle size in the range of from about 20 micrometers to about 500 micrometers and containing alumina, silica and zinc oxide. One embodiment of this method includes the enhancement of the attrition resistance of the fluidizable sorbent material by providing an effective concentration of metal oxide in the fluidizable sorbent for providing an enhanced attrition resistance. This method, among others, can include mixing appropriate proportions of alumina, silica and zinc oxide to form a mixture with the mixture being impregnated with an aqueous solution of a metal containing compound to form an impregnated mixture. The impregnated mixture is agglomerated followed by granulation to provide a granulated material suitable for use as a fluidizable material.

Another aspect of the invention is a process for removing hydrogen sulfide from a fluid stream containing hydrogen sulfide by contacting the fluid stream with a fluidizable, zinc oxide based sorbent material, and recovering a stream having a concentration of hydrogen sulfide lower than that of the hydrogen sulfide containing fluid stream. The fluidizable, zinc oxide based sorbent material can be a fluidizable sorbent comprising particulates having a mean particle size in the range of from about 20 micrometers to about 500 micrometers and comprising alumina, silica and zinc oxide. The fluidizable sorbent can further contain an effective concentration of metal oxide for providing an enhanced attrition resistance of the particulates.

The fluidizable, zinc oxide based sorbent material used in the hydrogen sulfide sorption process include those produced by the novel method for making such sorbent material which includes the provision of an effective concentration of metal oxide in the fluidizable sorbent for providing an enhanced attrition resistance.

One approach to making the fluidizable sorbent having the enhanced attrition resistance includes the step of mixing appropriate proportions of alumina, silica and zinc oxide to form a mixture. The mixture is then impregnated with an aqueous solution of a metal containing compound to form an impregnated mixture. The impregnated mixture is agglomerated followed by granulation to produce a granulated material suitable for use as fluidizable material.

Another invention is a circulatable particulate material that is suitable for use in a transport desulfurization process system for removing hydrogen sulfide from a fluid stream. The circulatable particulate material must be circulatable within a fluidization zone in a first linear direction and circulatable within a transfer zone in a second linear direction. In order to be circulatable in a transport desulfurization process system, the circulatable particulate material must have the necessary physical properties including, for example, a mean particle size in the range of from about 20 micrometers to about 500 micrometers and comprising alumina, silica, and zinc oxide.

The inventive circulatable particulate material can be used in a transport desulfurization process for removing hydrogen sulfide from a fluid stream by contacting it with the fluid stream within a fluidization zone wherein is a fluidized bed of the circulatable particulate material that is circulating in a first linear direction. A separated circulatable particulate material and a stream having a concentration of hydrogen sulfide lower than that of the fluid stream are recovered. The separated circulatable particulate material is passed to a transfer zone wherein said separated circulatable particulate material is circulating in a second linear direction. A major portion of the separated circulatable particulate material is utilized as circulatable particulate material.

The attrition resistance of the circulatable sorbent particulate material can be enhanced by providing an effective concentration of metal oxide such that attrition resistance is enhanced.

BRIEF DESCRIPTION OF THE DRAWING

Other objects and advantages of the invention will be apparent from the following description of the invention, the claims and the drawings in which:

DETAILED DESCRIPTION OF THE INVENTION

Figure 1:
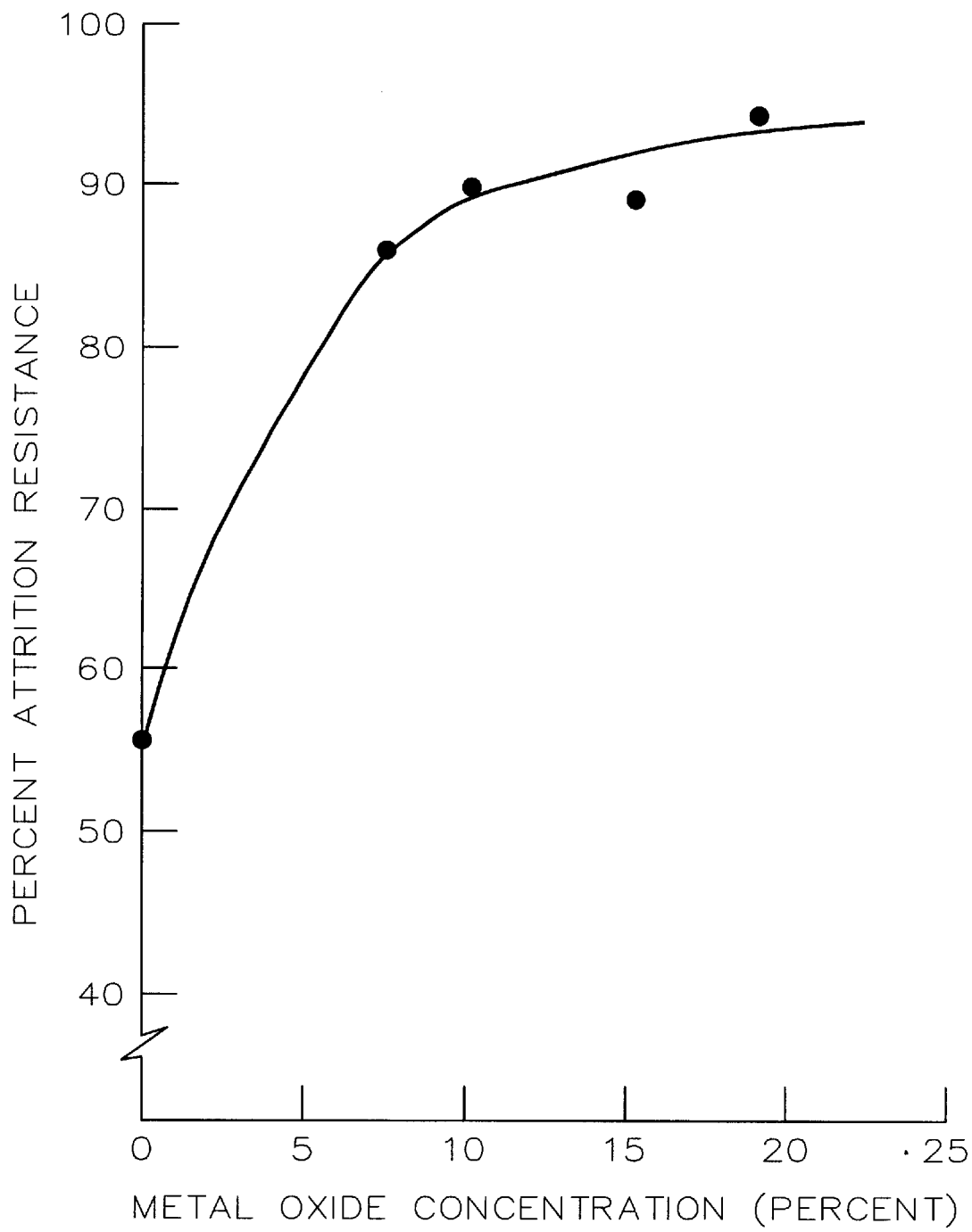
FIG. 1 is a plot of the attrition resistance of a zinc oxide based fluidizable sorbent versus the metal oxide concentration of the zinc oxide based fluidizable sorbent.

The novel sorption composition described herein is a fluidizable material capable of being fluidized within a fluidization zone when contacted by a lifting gas. Thus, it is critical for the sorption composition to have certain physical properties in order for it to be both fluidizable and able to remove, by a sorption mechanism, hydrogen sulfide from a fluid stream containing hydrogen sulfide.

A further critical property of the sorption composition is for it to be a circulatable particulate material suitable for use in a transport desulfurization system and having such physical properties that it is circulatable within a fluidization zone in a first linear direction and is circulatable within a transfer zone in a second linear direction. Thus, the term "circulatable" as used herein and in the claims is an adjective defining a sorbent particle or particles having the ability to form into a fluidized bed which can be conveyed in a first linear direction, preferably in an upwardly direction against gravitational force, at a high velocity while still having the ability to be conveyed in a second linear direction, preferably in the downwardly direction of gravitational force, at a velocity lower than the velocity in the first linear direction. Thus, the novel circulatable particulate material described herein has, in addition to being fluidizable, all the physical properties required for circulatability.

It has also been discovered that the method described herein produces a zinc oxide based sorbent material that has the properties necessary for fluidization and circulatability.

One of the properties desirable for a fluidizable and circulatable material to have is an ability to resist attrition when used under the conditions of a fluidized bed and in a transport desulfurization system. It has been discovered that, unexpectedly, the attrition resistance of a zinc oxide based, fluidizable and circulatable sorbent material can be improved or enhanced by providing a concentration of metal oxide in such fluidizable and circulatable sorbent material. This enhanced attrition resistance provides for a zinc oxide based, fluidizable and circulatable sorbent material that when fluidized within a fluidization zone or a regeneration zone loses less weight from attrition than such fluidizable and circulatable sorbent material not having a metal oxide concentration effective for enhancing the attrition resistance.

The property of having a high attrition resistance is particularly important to circulatable material that is used in transport desulfurization systems due to high linear velocities of the fluidized bed being conveyed.

In the manufacture of the fluidizable and circulatable sorbent material, the primary components of alumina, silica and zinc oxide are combined together in appropriate proportions by any suitable manner which provides for the intimate mixing of the components to provide a substantially homogeneous mixture. A binder can also be incorporated as a component into the mixture formed during the mixing step. Such a binder can be any suitable material that provides binding properties including those selected from the group consisting of calcium aluminate, bentonite, kaolin, colloidal silica, sodium silicate and any two or more thereof. The amount of binder used in the mixing step can be such as to provide a binder concentration in the mixture of from about 1 to about 20 weight percent of the total weight of the mixture, and, preferably, from 5 to 20 weight percent.

Any suitable means for mixing the sorbent components can be used to achieve the desired dispersion of the materials. Many of the possible mixing means suitable for use in the inventive process are described in detail in *Perry's Chemical Engineers' Handbook Sixth Edition*, published by McGraw-Hill, Inc., at pages 19–14 through 19–24, which pages are incorporated herein by reference. Thus, suitable mixing means can include, but is not limited to, such devices as tumblers, stationary shells or troughs, muller mixers, which are either batch type or continuous type, impact mixers, and the like. It is preferred to use a muller mixer in the mixing of the silica, alumina and zinc oxide components.

Once the sorbent components are properly mixed, the mixture can be impregnated with a metal oxide compound or a precursor of a metal oxide compound which suitably provides for an enhancement of the attrition resistance of the final fluidizable and circulatable sorbent material as described herein. The metal oxide compound or precursor of a metal oxide compound also can serve as a promoter or a precursor of a promoter. Examples of suitable metal oxides for enhancing attrition resistance can include the oxides of molybdenum, tungsten, one or more metals selected from Group VIII of the Periodic Table, and any other metal that is known to have hydrogenation ability of the type necessary to reduce sulfur oxide species to hydrogen sulfide. The preferred metal oxide is nickel oxide.

The metal oxide may be added to the mixture in the form of the elemental metal, metal oxide, and/or metal-containing compounds that are convertible to metal oxides under calcining conditions. Some examples of such metal-containing compounds include metal acetates, metal carbonates, metal nitrates, metal sulfates, metal thiocyanates, and mixtures of two or more thereof. In a preferred embodiment of the present invention, the metal of the metal-containing compound is nickel.

The elemental metal, metal oxide, and/or metal-containing compounds can be added to the mixture by impregnation of the mixture with a solution, either aqueous or organic, that contains the elemental metal, metal oxide, and/or metal-containing compound.

In the method of making the fluidizable and circulatable sorbent composition, the mixture of alumina, silica and zinc oxide can be impregnated with an aqueous solution of a metal oxide or metal oxide precursor prior to agglomeration followed by granulation. The method can also include the impregnation of an agglomerate of the mixture of alumina, silica, and zinc oxide with the aqueous solution of the metal oxide followed by granulation. Another alternative includes the impregnation of the granulate formed by the granulation of an agglomerate of the mixture of alumina, silica, and zinc oxide with the aqueous solution of the metal oxide. If the metal oxide is nickel oxide or a precursor of nickel oxide, it is preferred to perform the impregnation step after the granulation step.

In the case in which the zinc oxide based, fluidizable and circulatable sorbent material is formed by spray drying a suspension of the sorbent components, the metal oxide or precursor of the metal oxide can be conveniently added at any time which suitably provides for the zinc oxide based, fluidizable and circulatable sorbent having enhanced attrition resistance properties as compared to such fluidizable and circulatable sorbent that does not contain a metal oxide component. A spray dried fluidizable and circulatable sorbent material, which does not contain metal oxide, can be impregnated with an aqueous solution of a metal oxide or metal oxide precursor so as to ultimately provide an attrition resistance enhancing concentration of metal oxide. Alternatively, the metal oxide or metal oxide precursor can be included as a part of the suspension of sorbent components that is spray dried to form the zinc oxide based, fluidizable and circulatable sorbent.

The impregnation solution is any aqueous solution and amount of such solution which suitably provides for the impregnation of the mixture of alumina, silica and zinc oxide to give an amount of metal oxide in the final zinc oxide based, fluidizable and circulatable sorbent composition that provides for enhanced attrition resistance properties or, alternatively, a concentration of metal oxide as described elsewhere herein. Therefore, the aqueous solution can include a metal compound that is both soluble in water and is a metal oxide or a metal oxide precursor. The concentration of the metal-containing compound in the aqueous solution can be in the range of from about 0.1 grams of anhydrous metal-containing compound per gram of water to about 2 grams of anhydrous metal-containing compound per gram of water. Preferably, the weight ratio of anhydrous metal-containing compound to water in the aqueous solution can be in the range of from about 0.5:1 to about 1.5:1 but, most preferably, it is in the range of from 0.75:1 to 1.25:1.

The metal oxide will generally be present in the zinc oxide based, fluidizable and circulatable sorbent composition in an amount effective for enhancing the attrition resistance of a zinc oxide based, fluidizable and circulatable sorbent that does not contain a metal oxide. Generally, the concentration of metal oxide in the zinc oxide based, fluidizable and circulatable sorbent composition can be in the range of from about 0.1 weight percent to about 40 weight percent, and will preferably be in the range of from about 1 weight percent to about 25 weight percent. Most preferably, the metal oxide concentration can range from 2 weight percent to 20 weight percent. The weight percent of the metal oxide in the zinc oxide based, fluidizable and circulatable sorbent is expressed in terms of the metal oxide based upon the total weight of the absorbing composition.

A desirable and unexpected aspect of one embodiment of the invention herein is that no special and expensive method of agglomeration is used to form the agglomerate that is subsequently granulated to form a fluidizable and circulatable material. Prior to the discovery of the novel and unexpected method described herein, those skilled in the art of producing fluidizable materials believed that, in order to produce such a fluidizable material, expensive spray drying techniques were required. However, the present inventive method utilizes agglomerating, without spray drying, followed by granulating to form a sorbent material having the critical properties necessary for fluidizability and circulatable.

Any means suitable for forming an agglomerate of the impregnated mixture can be utilized, provided that no spray drying techniques are used to form the agglomerate. The agglomerate can be formed by such methods as molding, tabletting, pressing, pelletizing, extruding, tumbling and densifying. The preferred method of agglomeration is by densification.

Various approaches can be used in performing the preferred densification of the mixture. In the preferred of these methods, the powdered components are placed in the bowl of a kneader or muller mixer of which the bowl and blades are rotated while simultaneously adding either water or, preferably, an aqueous acid solution, to the mixture to form a paste. The aqueous acid solution can have an acid concentration of from about 0.1 to about weight percent acid selected from the group consisting of HCl, $H_2SO_4$, $HNO_3$ and $CH_3COOH$. The amount of water or aqueous acid solution added to the mixture during densification can generally be in the range of from about 20 to about 60 weight percent of the resultant slurry or paste, but, preferably, it can be in the range of from 30 to 50 weight percent.

The paste produced by the densification method is dried at a temperature in the range of from about 150° F. to about 350° F. to form a dried agglomerate. The dried agglomerate can also be calcined at a temperature in the range of from about 400° F. to about 1500° F. and, preferably, in the range of from 800° F. to 1300° F.

The final step in the method of making a fluidizable and circulatable, zinc oxide based sorbent material includes the grinding, crushing or granulating of the agglomerate so as to produce a granulated material having the critical physical properties necessary for fluidizability and circulatability. Any suitable means for granulating the agglomerate into particles having physical properties which provide for a fluidizable and circulatable material can be used. Many of the granulating means or grinding means or crushing means suitable for use in the inventive process are described in detail in the aforementioned *Perry's Chemical Engineers' Handbook Sixth Edition* at pages 8–20 through 8–48, which pages are incorporated herein by reference. Thus, suitable grinding, granulating or crushing means can include such devices as crushers, mills, shredders, and cutters. The preferred apparatus for the size reduction of the agglomerate into fluidizable particles include mills.

One critical aspect of the inventive processes or methods described herein is the necessary requirement that the fluidizable and circulatable, zinc oxide based sorbent material be particulate material having a mean particle size in the range from about 20 micrometers to about 500 micrometers. Preferably, the particles can have a mean size in the range from about 40 micrometers to about 400 micrometers and, most preferably, the particle size can be in the range from 100 to 300 micrometers. The particle size is a particularly important physical property of the sorbent in imparting circulatability; since, particle size is among a number of other physical properties that critically impact the ability of the sorbent particles to circulate within a transport desulfurization system.

When referring herein to the term "mean particle size" of the fluidizable and circulatable material, the term shall mean the size of the particulate material as determined by using a RO-TAP Testing Sieve Shaker, manufactured by W. S. Tyler Inc., of Mentor, Ohio, or other comparable sieves. The material to be measured is placed in the top of a nest of standard eight inch diameter stainless steel frame sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size.

One of the many unexpected aspects of this invention is that it is an unnecessary requirement for the granulated material to be substantially spherical in shape in order for it to be fluidizable and circulatable. But, due to the method by which the granulated material is produced, the particles of granulated material are not necessarily spherical in shape. Rather, such particles will ordinarily be irregular or random shaped particles, therefore, not substantially spherical. The surprising aspect of this invention is that the aforementioned irregular or random shaped particles, or non-spherically shaped particles, can suitably be used as a fluidized bed material within a fluidization zone and can be suitably circulated within the fluidization and transfer zones of a transport desulfurization system. This is possible only due to the unique combination of physical properties of the sorbent matrix or material imparted by such properties as the density and hardness of the mixture, specific components of the mixture, and the size of the particulate material.

Another embodiment of the invention includes a drying step whereby the agglomerate is dried prior to granulating the thus-dried agglomerate. The agglomerate can be dried prior to granulation preferably at a temperature generally in the range of from about 150° F. to about 575° F. and, more preferably, in the range of from about 200° F. to about 500° F., for a period of time of at least about 0.5 hours but, generally, in the range of from about 0.5 hour to about 4 hours and, more preferably, in the range of from about 1 hour to about 3 hours.

The dried agglomerate can also be calcined in the presence of oxygen at a temperature suitable for achieving the desired degree of calcination, for example, generally in the range of from about 700° F. to about 1600° F. and, more preferably, in the range of from about 900° F. to about 1400° F. The calcination step is conducted for a period of time suitable for achieving the desired degree of calcination, for example, generally in the range of from about 0.5 hour to about 4 hours and, more preferably, in the range of from about 1 hour to about 3 hours to produce a material for granulation.

The starting alumina component of the composition can be any suitable commercially available alumina material including colloidal alumina solutions and, generally, those alumina compounds produced by the dehydration of alumina hydrates. A preferred alumina is boehmite alumina. The alumina can also contain minor amounts of other ingredients, such as, for example, 1–10 weight percent silica, which do not adversely affect the quality of the final composition, but it is generally desirable to have an essentially pure alumina as a starting material for the composition of this invention. The starting alumina can be made in any manner well known in the art, examples of which are described at length in Kirk-Othmer *Encyclopedia of Chemical Technology*, 3rd Edition, Vol. 2, pp. 218–240. As an example, a suitable commercially available starting alumina for use in the composition of this invention is manufactured by Vista Corporation, designated as Catapal® and Dispal® aluminas.

The zinc oxide used in the preparation of the absorbing composition can either be in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

The silica used in the preparation of the absorbing composition may be either in the form of silica, or in the form of one or more silicon compounds that are convertible to silica under the conditions of preparation described herein. Any suitable type of silica may be used in the absorbing composition employed in the process of the present invention. Examples of suitable types of silica include diatomite, silicalite, silica colloid, flame-hydrolyzed silica, hydrolyzed silica, and precipitated silica, with diatomite being presently preferred. Examples of silicon compounds that are convertible to silica under the conditions of preparation described herein include silicic acid, sodium silicate, and ammonium silicate. Preferably, the silica is in the form of diatomite.

The zinc oxide will generally be present in the sorbent composition in an amount in the range of about 10 weight-% to about 90 weight-%, and will more preferably be in the range of about 30 weight-% to about 90 weight-%, and will most preferably be in the range of about 45 weight-% to about 60 weight-%, when said weight-%'s are expressed in terms of the zinc oxide based upon the total weight of the sorbent composition.

The silica will generally be present in the sorbent composition in an amount in the range of about 5 weight-% to about 85 weight-%, and will more preferably be in the range of about 20 weight-% to about 60 weight-%, when said weight-%'s are expressed in terms of the silica based upon the total weight of the sorbent composition.

The alumina will generally be present in the sorbent composition in an amount in the range of about 5.0 weight-% to about 30 weight-%, and will more preferably be in the range of about 5.0 weight-% to about 15 weight-%, when said weight-%'s are expressed in terms of the weight of the alumina compared with the total weight of the sorbent composition.

To provide a zinc oxide based, fluidizable and circulatable sorbent that has an enhanced attrition resistance, the particulate having a mean particle size in the range of from about 20 micrometers to about 500 micrometers must contain an effective concentration of attrition resistance enhancing metal oxide. Generally, such effective concentration of attrition resistance enhancing metal oxide is in the range of from about 0.1 weight percent to about 40 weight percent, but, preferably, such concentration range is from about 1 weight percent to about 25 weight percent. Most preferably, the concentration of attrition resistance enhancing metal oxide will be in the range of from 2 weight percent to 20 weight percent. The weight percent of the attrition resistance enhancing metal oxide is based upon the total weight of the zinc oxide based, fluidizable sorbent.

The attrition resistance of the zinc oxide based, fluidizable and circulatable sorbent having an attrition resistance enhancing effective concentration of metal oxide is generally greater than about 55 weight percent, but it is desirable for the attrition resistance of the fluidizable and circulatable particulate to be at least about 60 percent. Preferably, however, the attrition resistance of the fluidizable and circulatable sorbent should exceed about 80 percent, and, most preferably, the attrition resistance should exceed 90 percent. Thus, to enhance the attrition resistance of the particulate of a fluidizable and circulatable sorbent having a mean particle size in the range of from about 20 micrometers to about 500 micrometers and containing alumina, silica and zinc oxide, a concentration of metal oxide suitable for providing the desired attrition resistance must be provided in the fluidizable and circulatable sorbent.

To determine the attrition resistance of a fluidizable and circulatable sorbent material for use in a fluidizable bed and, in particular, in a transport desulfurization system for removing sulfur from a fluid stream, a bench-scale test is used. Thus, any use of the term "attrition resistance" in this specification and in the appended claims refers to a determination of attrition resistance by use of the bench-scale apparatus and testing procedure substantially as described herein. This bench-scale test simulates the fluidized sorption process and transport desulfurization process attrition conditions and measures the weight loss of the fluidizable and circulatable sorbent under the testing conditions for a given time period to give a percent attrition of the fluidizable and circulatable sorbent.

Figure 2:
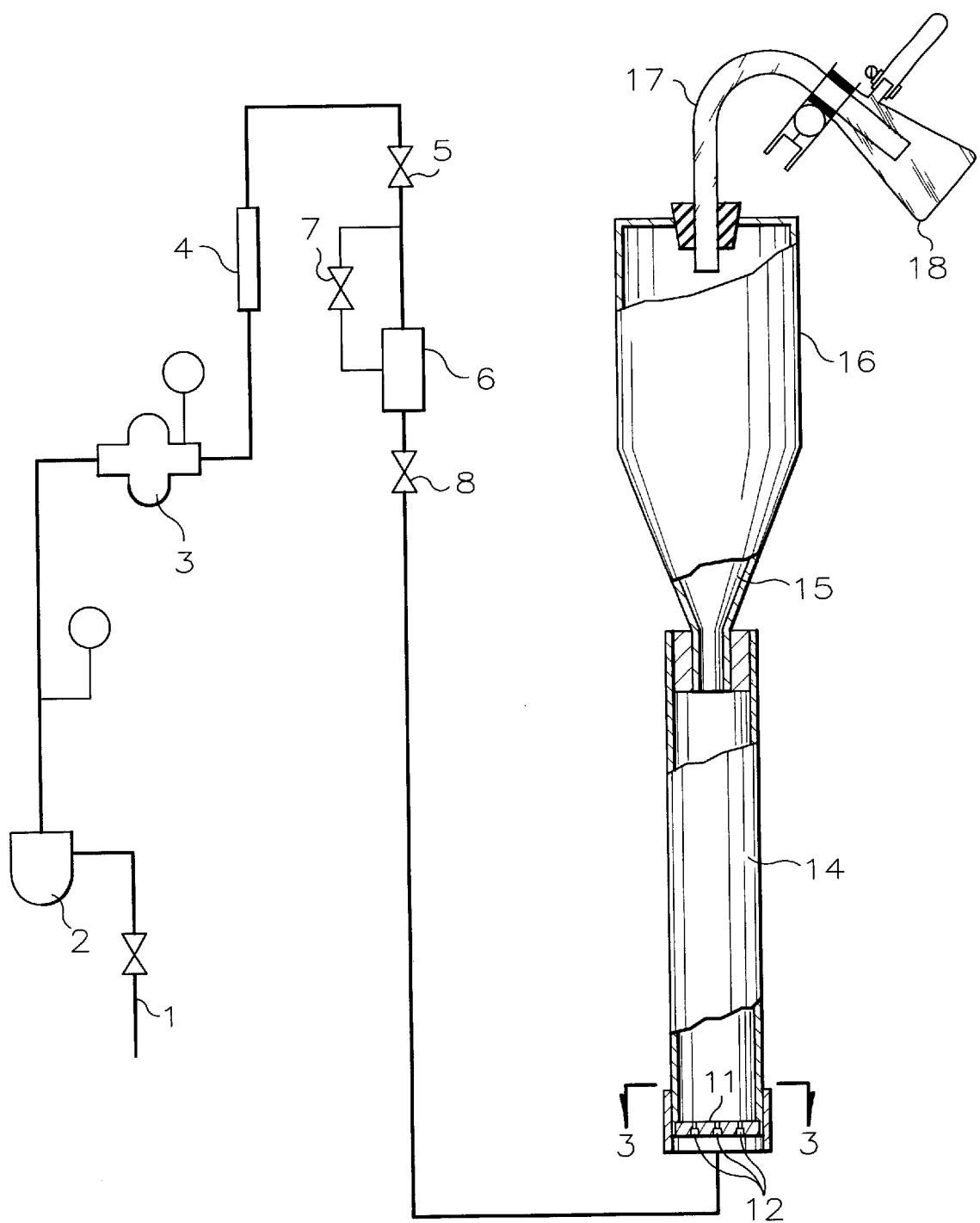
FIG. 2 is a schematic flow diagram of the apparatus used to measure the attrition resistance of a fluidizable sorbent.
Figure 3:
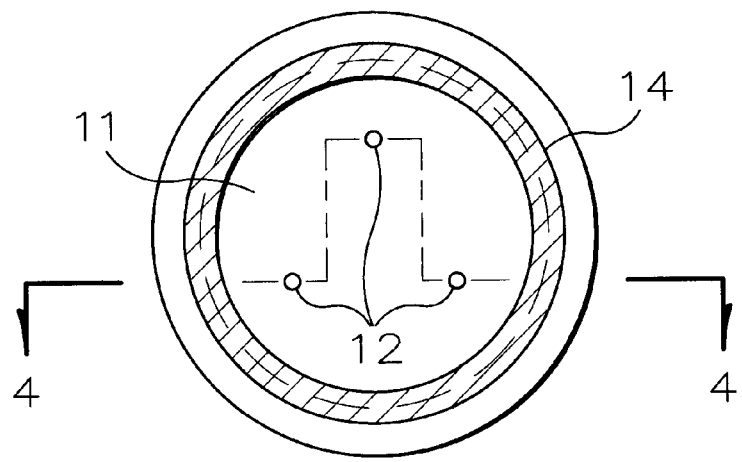
FIG. 3 is a section taken along line 3—3 of FIG. 2.
Figure 4:
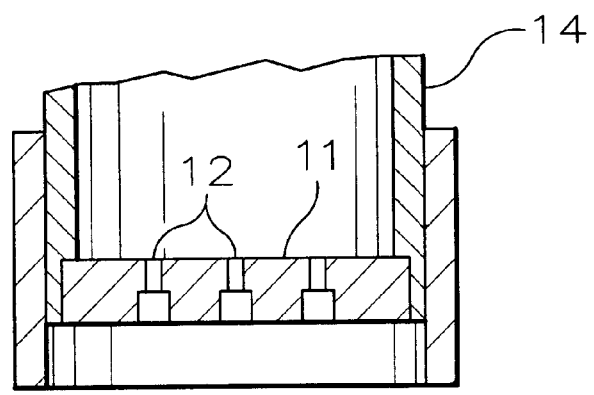
FIG. 4 is a section taken along line 4—4 of FIG. 3.

Reference is made to the bench-scale test apparatus depicted in FIGS. 2, 3 and 4. An air supply 1 is connected to a filter 2 and to a pressure regulator 3, flow meter 4, valve 5, regulator valve 7, flow controller 6 and valve 8. Air passes through symmetrically spaced bores in a 7/16 inch radius, 1/8 inch thick plate 11. The counter bores 12 on the entry side are 1/16 inch diameter and 1/16 inch deep. On the exit side, the holes are 0.0150±0.0002 inch in diameter and 1/16 inch deep. The dense phase 1/8 inch walled tube 14 is 1½ inches I.D. and 27½ inches in length. The disengaging space is formed of a conical section 15 of 5 inches length, a cylindrical section 16 5 inches in diameter and 18 inches in length, an exit semicircular 9/16 inches O.D. glass tube 17 having a height measured from the top of 16 to the outer wall of the glass tubing of 4 inches. The glass tubing is connected to a 250 mL filter flask with attached extraction thimble 18 (45 mm by 123 mm).

To determine the percent attrition of the fluidizable and circulatable sorbent material, an amount of the fluidizable and circulatable sorbent material is first sifted through 80 mesh and 140 mesh sieves to give a −80 to +140 fraction of a presieved material. A measured amount, usually 50 grams, of the presieved material is placed in tube 14. Air at 75 psig and ambient temperature is passed into tube 14 at a rate of 15.0±0.1 cubic feet per hour thereby tumbling the fluidizable and circulatable sorbent material in a dense phase. Fines are separated in the disengagement space in conical section 15 and cylindrical section 16 and collected in filter flask and extraction thimble 18. The material collected in filter flask and extraction thimble 18 is weighed at desired time intervals, preferably at five (5) hours, twenty (20) hours, and forty-five (45) hours. The percent attrition is calculated by dividing the weight of collected fines by the weight of the measured amount of the presieved material placed in tube 14 with the ratio being multiplied by one hundred. The difference of one hundred less the percent attrition is the attrition resistance of the fluidizable and circulatable sorbent.

The process of the present invention is a sorption process for removing sulfur compounds from a gaseous stream containing therein such sulfur compounds, which particularly include hydrogen sulfide. A fluid stream containing hydrogen sulfide is contacted with the sorbent compositions of the present invention, as described herein, under suitable sorption conditions to substantially reduce the concentration of hydrogen sulfide of the fluid stream without significantly increasing the concentration of sulfur dioxide therein.

It is believed that the hydrogen sulfide is being absorbed by the sorption composition and thus the terms "sorption process" and "sorption composition", or like terms, are utilized for the sake of convenience. However, the exact chemical phenomenon occurring is not the inventive feature of the process of the present invention and the use of the terms "sorption", "sorbent", or like terms in any form are not intended to limit the present invention.

The chemical changes that are believed to occur in the sorption composition during this process are summarized in the following equations:

$$ZnO + H_2S \rightarrow ZnS + H_2O \tag{I}$$

$$ZnS + Oxygen \rightarrow ZnO + SO_x \tag{II}$$

The sorption composition of the present invention may be utilized to remove hydrogen sulfide from any suitable gaseous stream. The hydrogen sulfide may be produced by the hydrodesulfurization of organic sulfur compounds or may be originally present in the gaseous stream as hydrogen sulfide. Examples of such suitable gaseous streams include light hydrocarbons such as methane, ethane and natural gas; gases derived from petroleum products and products from extraction and/or liquefaction of coal and lignite; gases derived from tar sands and shale oil; coal derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

The preferred sorption process utilizes a transport desulfurization system which includes a fluidization zone and a transfer zone. The fluidizable and circulatable sorbent material is introduced into the transport desulfurization system wherein it is fluidized and circulates from and through the fluidization zone to and through the transfer zone and back to the fluidization zone. Thus, it is critical to the preferred sorption process for the sorbent material to be both fluidizable and circulatable.

One feature of the inventive transport desulfurization process includes contacting a fluid or gaseous stream containing a concentration of hydrogen sulfide with a fluidized bed of the circulatable sorption composition described herein and contained within a fluidization zone of a transport desulfurization system. The fluidization zone can be defined by any apparatus or equipment which can suitably define such fluidization zone including, for example, an elongated conduit. The contacting gaseous stream serves as the lifting gas to provide for fluidization and transport of the circulatable sorbent compositions. The lift gas will flow in a first linear direction through the bed of sorbent material. Preferably, the first linear direction is upwardly against gravitational force.

The velocity of the lift gas or fluidization gas should be sufficient to provide for the required fluidization of the sorbent and to provide for the circulation of the fluidized bed at a high velocity. Generally, the velocity of the lift or fluidization gas must be such as to provide for the first linear velocity of the circulating bed within the fluidization zone of the transport desulfurization system in the range of from about 3 ft/sec to about 40 ft/sec, preferably, from 10 ft/sec to 30 ft/sec, and most preferably, from 15 ft/sec to 25 ft/sec. To achieve the required first linear velocity, the lift gas velocity is generally in the range of from about 0.1 ft/sec to about 25 ft/sec. More preferably, the velocity of the fluidization gas through the fluidization zone can range from about 0.15 ft/sec to about 20 ft/sec and, most preferably, the fluidization velocity can range from 0.175 ft/sec to 15 ft/sec.

The residence time of the circulatable sorbent composition within the fluidization zone can generally be in the range of from about 0.5 second to about 30 seconds. Preferably, the residence time of the circulatable sorption composition in the fluidization zone is in the range of from about 1 second to about 25 seconds and, most preferably, it is between 2 seconds and 10 seconds.

The process conditions within the fluidization zone are such that a portion, preferably a substantial portion, of the hydrogen sulfide concentration in the fluidization gas stream is reduced by the sorption mechanism or the removal of the hydrogen sulfide from the fluidization gas stream by the sorbent composition. Such suitable sorption process conditions include a process temperature in the range of from about 500° F. to 2000° F. Preferably, the contacting temperature can be in the range of from about 600° F. to about 1800° F. and, more preferably, it can be in the range of from 700° F. to 1700° F.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

The hydrogen sulfide concentration of the fluid stream to be treated and serving as the fluidization gas or lift gas will generally be in the range of from about 200 ppmv upwardly to about 20,000 ppmv. Particularly, the hydrogen sulfide concentration can range from about 300 ppmv to about 10,000 ppmv, and, preferably, from about 500 ppmv to about 5,000 ppmv.

The treated stream recovered and exiting from the fluidization zone shall have a concentration of hydrogen sulfide below that of the stream entering the fluidization zone. Thus, the concentration of hydrogen sulfide in the treated stream can be less than about 200 ppmv. Most preferably, the concentration is less than about 100 ppmv and, most preferably, it is less than 20 ppmv.

Also recovered from the fluidization zone is the circulatable sorbent material which is separated from the treated stream thereby being a separated circulatable sorption composition. The separated circulatable sorption composition is passed to a transfer zone through which the separated circulatable sorption composition circulates in a second linear direction, preferably, in the downwardly direction of gravitational force. The transfer zone can be defined by any apparatus or equipment which suitably defines a conduit that is, preferably elongated. A major portion of the separated circulatable sorption composition can be returned to the fluidization zone for use as the circulatable sorbent material. The bed of separated circulatable sorbent composition circulates within the transfer zone in a second linear direction, preferably, in the downward direction of gravitational force. The second linear velocity of the circulating bed of separated circulatable sorbent composition within the transfer zone is generally less than the first linear velocity and is less than about 25 ft/sec, preferably, less than about 15 ft/sec. and, most preferably, less than 10 ft/sec.

To regenerate a sulfided circulatable sorbent material, at least a portion of the separated circulatable sorption composition is passed to a regeneration means for regenerating a sulfided circulatable sorbent material. The regeneration means is any apparatus or equipment which defines a regeneration zone wherein is introduced a sulfided circulatable sorbent material, preferably at least a portion of the separated circulatable sorption composition, which is contacted with an oxygen containing gas stream, preferably undiluted air, under process conditions suitable for regenerating the sulfided circulatable sorbent material. The oxygen containing gas stream may serve both as a regeneration gas and as a lifting gas within the regeneration zone to fluidize the sulfided circulatable sorbent material.

The velocity of the oxygen containing gas stream in the regeneration zone is generally in the range of from about 0.1 ft/sec to about 25 ft/sec. More preferably, the velocity of the oxygen containing gas stream through the regeneration zone can range from about 0.15 ft/sec to about 20 ft/sec and, most preferably, it can range from 0.175 ft/sec to 15 ft/sec.

The residence time of at least a portion of the separated circulatable sorbent composition in the regeneration zone is significantly longer than the residence time of the circulatable sorbent composition in the fluidization zone. Generally, the residence time for at least a portion of the separated circulatable sorbent composition in the regeneration zone exceeds about 30 seconds and ranges upwardly to about 15 minutes. Preferably, however, this residence time is in the range of from about 1 minute to about 12 minutes and, most preferably, from 2 minutes to 10 minutes.

The process conditions within the regeneration zone should be such as to regenerate the separated circulatable sorbent composition by converting the zinc sulfide contained therein to zinc oxide and to provide a regenerated, separated circulatable sorbent composition which can suitably be used in the fluidization zone as a circulatable sorbent composition. The regeneration conditions include regeneration temperatures in the range of from about 800° F. to about 1600° F. Preferably, the regeneration temperature can range from about 1000° F. to about 1500° F. and, most preferably, from 1200° F. to 1450° F.

The regeneration zone can be operated at any suitable pressure to effect the regeneration of the separated circulatable sorbent composition. The regeneration pressure will generally be in the range of from about atmospheric to about 2000 psig.

Figure 5:
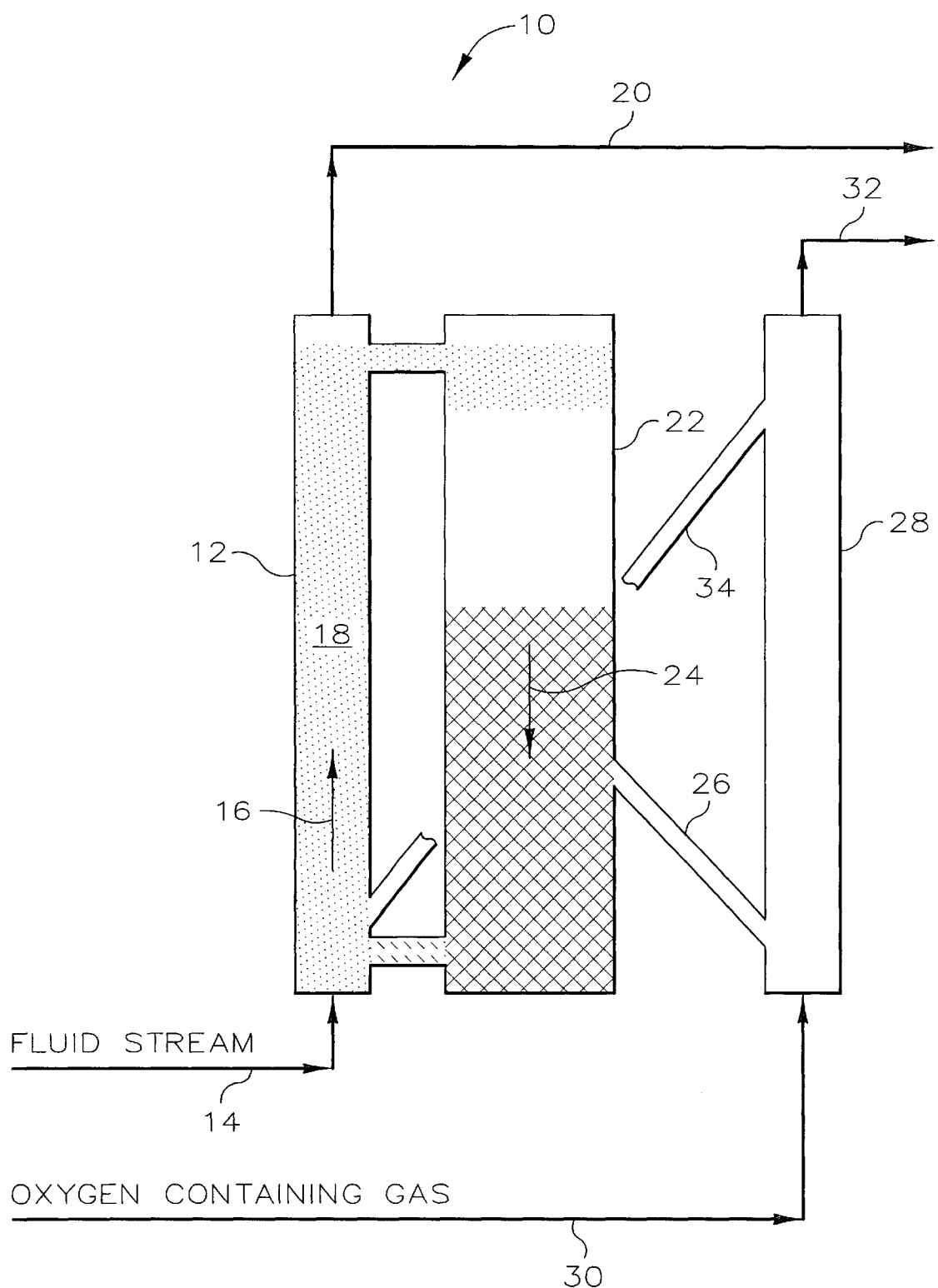
FIG. 5 is a simplified schematic flow diagram of a transport desulfurization process and system which utilizes a circulatable sorbent.

Reference is now made to FIG. 5, which provides a simplified depiction of transport desulfurization process system 10 for removing sulfur compounds from a gaseous or fluid stream containing such sulfur compounds. The fluid stream is charged to riser 12 by way of conduit 14. Riser 12 defines a fluidization zone wherein is contained a circulatable particulate material that is both fluidizable and circulatable. The fluid stream is introduced into riser 12 in a first linear direction 16 and provides for the fluidization and circulation of the circulatable particulate material 18 in such first linear direction 16. A stream having a concentration of sulfur lower than that of the fluid stream is separated from the circulatable particulate material 18 and passes from riser 12 by way of conduit 20.

The separated circulatable particulate material passes to recirculation conduit 22. Recirculation conduit 22 defines a transfer zone wherein the separated circulatable particulate material circulates in a second linear direction 24. The separated circulatable particulate material circulates in second linear direction 24 in the downwardly direction of gravitational force with a major portion thereof being returned to riser 12 for use as circulatable particulate material.

To regenerate the separated circulatable particulate material, at least a portion of the separated circulatable particulate material is passed via conduit 26 to regenerator 28, and operated under suitable regeneration conditions which defines a regeneration zone, for regenerating the separated circulatable particulate material. An oxygen containing gas stream, preferably air, is introduced into regenerator 28 by way of conduit 30 and provides for fluidization of the at least a portion of the separated circulatable particulate material. The regeneration gases pass from regenerator 28 by way of conduit 32. A regenerated separated circulatable particulate material may be used as circulatable particulate material 18 and is passed to riser 12 by way of conduit 34.

The following examples are presented in further illustration of the invention.

EXAMPLE I

Absorbent A was prepared by mixing in a mix-muller, 145.6 g of Vista Chemical Dispal 180 alumina, 462. g diatomite silica, and 575.6 g of zinc oxide for 10 minutes. The well-mixed powder was impregnated with 335.6 g of nickel nitrate dissolved in 281 g of deionized water over a period of 3 minutes and the resulting mixture further mixed for 10 minutes. Another 68.7 g of deionized water was added to make the mix "wet". The wet paste was agglomerated by drying for 16 hours in a draft oven at 316° F. The dried agglomerates were granulated in a bench top Stokes Pennwalt Granulator (Model 43, Stokes Pennwalt, Warminster, Pa., fitted with a 40 mesh screen). The product was screened through 50 and 140 mesh screens and calcined at 1175° F. for one hour.

In a typical preparation, Absorbent B was prepared by first dry mixing 452 g of diatomite and 568 g of zinc oxide in a mix-muller for 15 minutes. While still mixing, 575 g of Nyacol Al-20 colloidal alumina solution was added to the powder and the paste further mixed for 25 minutes. The paste was then agglomerated by drying at 300° F. for 1 hour and calcining at 1175° F. for 1 hour. The agglomerates were granulated using Stokes Pennwalt Granulator fitted with a 40 mesh screen. The granulated powder was impregnated with 29.7 g of nickel nitrate dissolved in 24.8 g of deionized water per 100 g of powder. The impregnated power was again dried at 300° F. for 1 hour and calcined at 1175° F. for 1 hour.

The physical and chemical characteristics of Absorbents A and B are included in Table I. The attrition data presented in Tables I and III were obtained by using a procedure similar to that described in U.S. Pat. No. 4,010,116, which is incorporated herein by reference. Instead of using an attrition index, however, a percent attrition is reported. Percent attrition represents the amount of material lost as fines (due to attrition) at the end of 5-hr tests. The values reported in Tables I and III may be compared with a commercial FCC (fluid cracking catalyst) catalyst used in petroleum refinery crackers. One such catalyst, Davison Chemicals' GXP-5, under the same test conditions yielded 4.59% attrition.

TABLE I

| Particle Size Distribution, % | Physical Properties | |
|---|---|---|
| | Absorbent A | Absorbent B |
| >297 microns | 0.4 | 0.0 |
| 149 microns | 78.0 | 65.1 |
| 105 microns | 19.5 | 22.7 |
| 88 microns | 1.9 | 6.9 |
| 74 microns | 0.1 | 4.8 |
| 53 microns | 0.0 | 0.5 |
| <53 microns | 0.0 | 0.0 |
| Bulk Density, g/cc | 0.90 | 1.01 |
| % Attrition (5-hr test) | | |

EXAMPLE II

To test the efficacy of the new fluidizable absorbents, Absorbent B was subjected to a standard absorption test in which the absorbent was alternately contacted with a hydrogen sulfide ($H_2S$)-containing gaseous stream and regeneration air. The hydrogen sulfide-containing gas is mixed with the inert gases of carbon dioxide ($CO_2$) and nitrogen ($N_2$) and during the absorption step the absorbent is loaded with sulfur to form ZnS. Air is used to regenerate the sulfur-laden absorbent to its original ZnO form during the regeneration step. The reactor temperatures for the two steps were respectively 800° F. and 1100° F. The sulfur loading on the absorbent was determined to be complete when hydrogen sulfide was detected at 100 ppm in the effluent stream, at that point the sulfided material was regenerated in air.

The test data for Absorbent B are included in Table II. These data clearly show that the absorbents of this invention are highly effective in sulfur removal. Even after 13 cycles of operation, the amount of sulfur removed at breakthrough was quite high.

TABLE II

Hydrogen Sulfide Absorption Test Results
Absorbent B

| Cycle # | Sulfur Loading (%) |
|---------|--------------------|
| 1 | 15.4 |
| 2 | 14.4 |
| 3 | 13.7 |
| 4 | 13.4 |
| 5 | 13.0 |
| 6 | 12.7 |
| 7 | 12.7 |
| 8 | 12.5 |
| 9 | 12.5 |
| 10 | 12.2 |
| 11 | 12.0 |
| 12 | 11.8 |
| 13 | 11.7 |

EXAMPLE III

Absorbent B was tested in a transport fluid bed reactor test unit at room temperature, using air as lifting gas, to determine its fluidizing ability and attrition resistance. The reactor unit consists of a riser (a central tube) 23 ft high that is jacketed with an annulus.

The sorbent is fluidized in the riser and circulated between riser and the annulus tubes. In this test, 10 lbs of sorbent were introduced into the annulus and fluidized with air flowing through the riser (up flow) at a linear velocity of 15 ft/sec. The fluidization air was controlled at 0.2 ft/sec in the annulus. This created a solid bed height of about 50 inches in the annulus and a solid circulation rate of 250 lb/hr. The average riser bed density was 6 lb/cu ft. Later in the test, an additional 11 lbs of sorbent were added to the annulus to increase solid bed height to 105 inches and the solid circulation to 590 lb/hr. Thus, in a 4.5 hour test, the absorbent was fluidized at a linear gas velocity of 15–25 ft/sec and the rate of solid carryover to the downstream dust collector was only 0.4 weight %. This demonstrates that the attrition rate is extremely low thereby indicating the durability of the absorbent.

During the test, the transport fluidized bed system remained very stable indicating exceptionally good fluidization characteristics for the sorbent. Thus, the absorbent of this invention is highly durable, has low attrition and excellent fluidizing ability even though the absorbent particles are not substantially spherical, which in the prior art was though to be a requirement in order for the material to be suitable for use in a fluidized bed reactor.

Hydrogen sulfide absorption/sorbent regeneration tests were carried out in a similar transport fluidized reactor test unit additionally having high temperature and high pressure capability. In this test unit, the riser is 30 ft in height. Thirty-four lbs of absorbent were charged into the reactor. The fluidization gas in the annulus was maintained at about 0.175 ft/sec while the gas velocity through the riser was set at 15 ft/sec. The absorption was carried out at 1000° F. and 100 psia. The absorption test was started with 500 ppmv $H_2S$ in nitrogen feed and incrementally raised to 8,000 ppm when the breakthrough occurred after about 42 hours on stream. The fully sulfided sorbent contained 15.7 wt% sulfur at breakthrough.

The sulfided sorbent was regenerated using a mixture of air/nitrogen at 65 psia and 1200° F. The gas linear velocity was 15 ft/sec. It took 4 hours of the complete regeneration. The sulfur content of the absorbent was reduced from 15.7 wt% sulfur to 0.05 wt% sulfur indicating a successful regeneration.

Physical and chemical characteristics of Absorbent B in Fresh, sulfided and regenerated states are included in Table III. From this data, it is concluded that the absorbents of this invention are highly durable, have excellent fluidization ability, low attrition rate and are highly effective in sulfur removal from fluid streams. It is noted that the absorbents, after sulfiding and regeneration, have essentially the same particle size distribution as the fresh absorbent. This shows the material to be durable and hard with low attrition. Surprisingly, the sulfided and regenerated sorbents have a lower percent attrition than the fresh sorbent indicating that instead of becoming "soft" during fluid bed operation, they actually become "harder." Furthermore, the attrition rate is now comparable to a commercial FCC catalyst.

The used sorbent from the pilot fluid bed reactor was also tested in the standard lab test for 13 cycles. The results obtained from the testing of the used sorbent are shown in Table IV. These data suggest that the hydrogen sulfide removal efficiency of the sorbent is as good or better after it had been subjected to a harsh, pilot fluidized reactor operation.

TABLE III

Properties of Fresh, Sulfided, and Regenerated Fluid Bed Absorbent B

| | Physical Properties | | |
|---|---|---|---|
| Particle Size Distribution, % | Absorbent B Fresh | Absorbent B Sulfided | Absorbent B Regenerated |
| >297 microns | 0.0 | 0.0 | 0.0 |
| 149 microns | 65.1 | 70.4 | 63.5 |
| 105 microns | 22.7 | 17.7 | 18.9 |
| 88 microns | 6.9 | 5.5 | 7.1 |
| 74 microns | 4.8 | 3.5 | 4.9 |
| 53 microns | 0.5 | 2.8 | 5.1 |
| <53 microns | 0.0 | 0.1 | 0.5 |
| Bulk Density, g/cc | 1.01 | 1.32 | 1.23 |
| % Attrition (5-hr test) | 14.1 | 5.4 | 4.3 |

TABLE IV

Hydrogen Sulfide Absorption Test Results Absorbent B

| Cycle # | Fresh Sorbent Sulfur Loading (%) | Used Sorbent Sulfur Loading (%) |
| --- | --- | --- |
| 1 | 15.4 | 17.3 |
| 2 | 14.4 | 14.4 |
| 3 | 13.7 | 14.4 |
| 4 | 13.4 | 14.6 |
| 5 | 13.0 | 14.2 |
| 6 | 12.7 | 14.2 |
| 7 | 12.7 | 14.0 |
| 8 | 12.5 | 14.0 |
| 9 | 12.5 | 13.5 |
| 10 | 12.2 | 13.7 |
| 11 | 12.0 | 13.5 |
| 12 | 11.8 | 13.4 |
| 13 | 11.7 | 13.4 |

EXAMPLE IV

This example demonstrates the unique benefits in improving the attrition resistance of a zinc oxide based fluidizable sorbent by the incorporation of a concentration of metal oxide in such fluidizable sorbent.

A fluidizable sorbent material having particle sizes in the range of from about 40 micrometers to about 500 micrometers and containing zinc oxide, celite silica and alumina were impregnated with a solution of $Ni(NO_3)2.6H_2O$ in deionized water to give particles containing different concentration levels of nickel oxide upon calcination. The impregnated particles were dried at 275° F. for 3 hours followed by calcination at 1175° F. for 2 hours in air.

The impregnated zinc oxide based fluidizabte sorbent particles and a comparative material were tested in the test apparatus using the test procedure both as described hereinabove. Pertinent results from these tests are presented in Table V.

TABLE V

Attrition Properties of a Zinc Oxide Based Fluidizable Sorbent as a Function of Metal Oxide Concentration

| Sorbent | Metal Oxide Concentration (percent) | 5 hours Percent Attrition | Percent Attrition Resistance |
| --- | --- | --- | --- |
| A (comparative) | 0.0 | 44.5 | 55.5 |
| B | 7.6 | 14.0 | 86.0 |
| C | 10.2 | 10.1 | 89.9 |
| D | 15.3 | 11.o | 89.0 |
| E | 19.1 | 5.8 | 94.2 |

The data presented in Table V relating to attrition resistance and metal oxide concentration are plotted in FIG. 1. It can be seen from these data that the attrition resistance of the fluidizable material improves with an increasing concentration of metal oxide with an apparent leveling of the incremental improvement in attrition resistance per incremental increase in metal oxide concentration at a metal oxide concentration upper limit of about 25 to about 30 weight percent.

The minimum attrition resistance is represented by the fluidizable material that contains no metal oxide with an attrition resistance of about 55 percent. Thus, to have an enhanced attrition resistance, the zinc oxide based fluidizable material will generally have an attrition resistance greater than about 55 percent. The data also show that, with a sufficient concentration of attrition resistance enhancing metal oxide, the attrition resistance of the zinc oxide based fluidizable material approaches, and can possibly exceed 95 percent. In view of the data presented in Table V and FIG. 1, the concentration of attrition resistance enhancing metal oxide in the zinc oxide based fluidizable material can be adjusted such that its attrition resistance can be at least about 60 percent but, preferably, exceeding about 80 percent and, most preferably, exceeding 90 percent.

Reasonable variations and modifications are possible within the scope of this disclosure without departing from the scope and spirit thereof.

That which is claimed is:

1. A transport desulfurization process comprising:

contacting a sulfur-containing fluid stream within a fluidization zone containing a fluidized bed of a circulatable particulate material having a mean particle size in the range of from about 20 micrometers to about 500 micrometers and comprising alumina, silica, zinc oxide, and an effective concentration of a metal oxide for providing an enhanced attrition resistance of said circulatable particulate material and wherein said circulatable particulate material is circulatable within a fluidization zone in a first linear direction and is circulatable within a transfer zone in a second linear direction wherein said first linear direction is upwardly against the direction of gravitational force and said second linear direction is downwardly in the direction of gravitational force, and wherein said circulatable particulate material is circulated in said first linear direction at a first linear velocity in the range of from about 3 to about 40 feet per second and in said second linear direction at a second linear velocity less than about 25 feet per second, and wherein said metal oxide is an oxide of molybdenum, tungsten or one or more Group VIII metals;

recovering a separated circulatable particulate material and a stream having a concentration of sulfur lower than that of said fluid stream;

passing said separated circulatable particulate material to said transfer zone wherein said separated circulatable particulate material is circulating in said second linear direction; and returning a major portion of said separated circulatable particulate material to said fluidization zone for use as said circulatable particulate material.

2. A process as recited in claim 1 wherein the residence time of said circulatable particulate material within said fluidization zone is in the range of from about 1 to about 10 seconds.

3. A process as recited in claim 2 further comprising:

passing at least a portion of said separated circulatable particulate material to a regeneration zone wherein said at least a portion of said separated circulatable material is contacted with an oxygen containing gas stream at a temperature in the range of from about 800° F. to about 1600° F. to thereby form a regenerated separated circulatable particulate material.

4. A process as recited in claim 3 wherein said zinc oxide is present in said circulatable particulate material in an amount in the range of from about 10 weight percent to about 90 weight percent, said silica is present in said circulatable particulate material in an amount in the range of from about 5 weight percent to about 85 weight percent, and said alumina is present in said circulatable particulate material in an amount in the range of from about 5 weight percent to about 30 weight percent.

5. A process as recited in claim 4 wherein said effective concentration of metal oxide is a concentration of metal oxide in said circulatable particulate material in the range of from about 0.1 weight percent to about 40 weight percent.

6. A process as recited in claim 5 wherein the attrition resistance of said circulatable particulate material is at least about 60 percent.

7. A process as recited in claim 6 wherein said metal oxide is nickel oxide.

8. A process as recited in claim 4 wherein said effective concentration of metal oxide is a concentration of metal oxide in said circulatable particulate material in the range of from about 1 weight percent to about 25 weight percent.

9. A process as recited in claim 8 wherein the attrition resistance of said circulatable particulate material exceeds about 80 percent.

10. A process as recited in claim 9 wherein said metal oxide is nickel oxide.

11. A process as recited in claim 10 wherein said mean particle size is in the range of from about 40 micrometers to about 400 micrometers.

12. A transport desulfurization process comprising:
  contacting a sulfur-containing fluid stream within a fluidization zone containing a fluidized bed of a circulatable particulate material comprising alumina, silica, zinc oxide and metal oxide, said circulatable particulate material having a mean particle size in the range of from about 20 micrometers to about 500 micrometers and an attrition resistance of at least about 60 percent and wherein said circulatable particulate material is circulating in a first linear direction;
  recovering a separated circulatable particulate material and a stream having a concentration of sulfur lower than that of said fluid stream;
  passing said separated circulatable particulate material to a transfer zone wherein said separated circulatable particulate material is circulating in a second linear direction; and
  returning a major portion of said separated circulatable particulate material to said fluidization zone for use as said circulatable particulate material and wherein said metal oxide is an oxide of molybdenum, tungsten, or one or more Group VIII metals.

13. A process as recited in claim 12 wherein said first linear direction is upwardly against the direction of gravitational force and said second linear direction is downwardly in the direction of gravitational force.

14. A process as recited in claim 13 wherein the circulating rate of said circulatable particulate material within said fluidization zone is in the range of from about 3 to about 40 feet per second and the circulating rate of said separated circulatable particulate material in said transfer zone is less than about 25 feet per second.

15. A process as recited in claim 14 wherein the residence time of said circulatable particulate material within said fluidization zone is in the range of from about 1 to about 10 seconds.

16. A process as recited in claim 15 further comprising:
  passing at least a portion of said separated circulatable particulate material to a regeneration zone wherein said at least a portion of said separated circulatable particulate material is contacted with an oxygen containing gas stream at a temperature in the range of from about 800° F. to about 1600° F. to thereby form a regenerated separated circulatable particulate material.

17. A process as recited in claim 16 wherein the concentration of metal oxide in said circulatable particulate material is in the range of from 2 weight percent to 20 weight percent.

18. A process as recited in claim 17 wherein the attrition resistance of said circulatable particulate material exceeds 90 percent.

19. A process as recited in claim 18 wherein said metal oxide is nickel oxide.

20. A process as recited in claim 19 wherein said mean particle size is in the range of from 100 micrometers to 300 micrometers.

21. A transport desulfurization process comprising:
  contacting a sulfur-containing fluid stream within a fluidization zone containing a fluidized bed of a circulatable particulate material comprising alumina, silica, zinc oxide and a concentration of metal oxide in the range of from about 0.1 weight percent to about 40 weight percent, said circulatable particulate material having a mean particle size in the range of from about 20 micrometers to about 500 micrometers and wherein said circulatable particulate material is circulating in a first linear direction;
  recovering a separated circulatable particulate material and a stream having a concentration of sulfur lower than that of said fluid steam;
  passing said separated circulatable particulate material to a transfer zone wherein said separated circulatable particulate material is circulating in a second linear direction; and
  returning a major portion of said separated circulatable particulate material to said fluidization zone for use as said circulatable particulate material and wherein said metal oxide is an oxide of molybdenum, tungsten, or one or more Group VIII metals.

22. A process as recited in claim 21 wherein said first linear direction is upwardly against the direction of gravitational force and said second linear direction is downwardly in the direction of gravitational force.

23. A process as recited in claim 22 wherein the circulating rate of said circulatable particulate material within said fluidization zone is in the range of from about 3 to about 40 feet per second and the circulating rate of said separated circulatable particulate material in said transfer zone is less than about 25 feet per second.

24. A process as recited in claim 23 wherein the residence time of said circulatable particulate material within said fluidization zone is in the range,of from about 1 to about 10 seconds.

25. A process as recited in claim 24 further comprising:
  passing at least a portion of said separated circulatable particulate material to a regeneration zone wherein said at least a portion of said separated circulatable particulate material is contacted with an oxygen containing gas stream at a temperature in the range of from about 800° F. to about 1 600° F. to thereby form a regenerated separated circulatable particulate material.

26. A process as recited in claim 25 wherein the attrition resistance of said circulatable particulate material is at least about 60 percent.

27. A process as recited in claim 26 wherein said zinc oxide is present in said circulatable particulate material in an amount in the range of from about 10 weight percent to about 90 weight percent, said silica is present in said circulatable particulate material in an amount in the range of from about 5 weight percent to about 85 weight percent, and said alumina is present in said circulatable particulate material in an amount in the range of from about 5 weight percent to about 30 weight percent.

28. A process as recited in claim 27 wherein said metal oxide is nickel oxide.

29. A process as recited in claim 25 wherein said concentration of metal oxide is in the range of from about 1 weight percent to about 25 weight percent.

30. A process as recited in claim 29 wherein the attrition resistance of said circulatable particulate material exceeds about 80 percent.

31. A process as recited in claim 30 wherein said zinc oxide is present in said circulatable particulate material in an amount in the range of from about 10 weight percent to about 90 weight percent, said silica is present in said circulatable particulate material in an amount in the range of from about 5 weight percent to about 85 weight percent and said alumina is present in said circulatable particulate material in an amount in the range of from about 5 weight percent to about 30 weight percent.

32. A process as recited in claim 31 wherein said mean particle size is in the range of from about 40 micrometers to about 400 micrometers.

33. A process as recited in claim 25 wherein said concentration of metal oxide is in the range of from about 2 weight percent to about 20 weight percent.

34. A process as recited in claim 33 wherein the attrition resistance of said circulatable particulate material exceeds 90 percent.

35. A process as recited in claim 34 wherein said zinc oxide is present in said circulatable particulate material in an amount in the range of from about 10 weight percent to about 90 weight percent, said silica is present in said circulatable particulate material in an amount in the range of from about 5 weight percent to about 85 weight percent, and said alumina is present in said circulatable particulate material in an amount in the range of from about 5 weight percent to about 30 weight percent.

36. A process as recited in claim 35 wherein said mean particle size is in the range of from 100 micrometers to 300 micrometers.

* * * * *